US006241168B1

(12) United States Patent
Young et al.

(10) Patent No.: US 6,241,168 B1
(45) Date of Patent: Jun. 5, 2001

(54) RECYCLING OF CARPET SCRAP AND COMPOSITIONS EMPLOYING ULTRALOW DENSITY POLYETHYLENE (ULDPE)

(75) Inventors: Dennis C. Young, Mechanicsburg; Stanley J. Chlystek, Mountville; Jeffrey Lynn Rice, Chambersburg, all of PA (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/329,607

(22) Filed: Jun. 10, 1999

(51) Int. Cl.$^7$ ................................................. B02C 11/08
(52) U.S. Cl. ........................... 241/23; 241/24.18; 241/25; 264/37; 264/143; 521/40.5; 525/64; 525/66; 525/166; 525/179
(58) Field of Search .................... 241/23, 24.18, 241/25; 264/37, 143; 521/40.5; 525/166, 179, 64, 66

(56) References Cited

U.S. PATENT DOCUMENTS

| | | | |
|---|---|---|---|
| Re. 31,826 | 2/1985 | Machell | 428/92 |
| 3,352,733 | 11/1967 | Kruce | 156/94 |
| 3,390,035 | 6/1968 | Sands | 156/72 |
| 3,537,946 | 11/1970 | Truax et al. | 161/66 |
| 3,551,231 | 12/1970 | Smedberg | 156/72 |
| 3,562,373 | 2/1971 | Logrippo | 264/118 |
| 3,583,936 | 6/1971 | Stahl | 260/28.5 |
| 3,620,860 | 11/1971 | Eckardt et al. | 156/247 |
| 3,676,280 | 7/1972 | Sands | 161/67 |
| 3,684,600 | 8/1972 | Smedberg | 156/93 |
| 3,725,538 | 4/1973 | Brewer | 423/449 |
| 3,857,799 | 12/1974 | Ooba et al. | 260/2.3 |
| 3,923,653 | 12/1975 | Lavins, Jr. | 210/71 |
| 3,928,051 | 12/1975 | Brownlow et al. | 106/53 |
| 3,940,525 | 2/1976 | Ballard | 428/96 |
| 3,941,066 | 3/1976 | Itoh et al. | 110/18 R |
| 3,956,414 | 5/1976 | Oshima | 260/683 R |
| 3,982,051 | 9/1976 | Taft et al. | 427/207 |
| 4,020,020 | 4/1977 | Appleyard et al. | 260/2.3 |
| 4,028,159 | 6/1977 | Norris | 156/94 |
| 4,082,874 | 4/1978 | Traylor, Jr. | 428/54 |
| 4,105,593 | 8/1978 | Stavrinou | 260/2.3 |
| 4,158,646 | 6/1979 | Benkowski et al. | 260/2.3 |
| 4,199,109 | 4/1980 | Watanabe | 241/14 |
| 4,234,366 | 11/1980 | Brewer et al. | 156/79 |
| 4,319,938 | 3/1982 | Vives | 156/49 |
| 4,522,857 | 6/1985 | Higgins | 428/95 |
| 4,535,940 | 8/1985 | Geng | 241/3 |
| 4,546,128 | 10/1985 | Nakajima | 523/222 |
| 4,576,665 | 3/1986 | Machell | 156/72 |
| 4,599,131 | 7/1986 | Matuszak | 156/584 |
| 4,662,569 | 5/1987 | Acker | 241/62 |
| 4,663,370 | 5/1987 | Marvel, Sr. et al. | 523/221 |
| 4,715,920 | 12/1987 | Ruppman et al. | 156/344 |
| 4,775,697 | 10/1988 | Schoenhard | 521/48 |
| 4,808,482 | 2/1989 | Benge et al. | 428/411.1 |
| 4,824,498 | 4/1989 | Goodwin et al. | 156/71 |
| 4,844,765 | 7/1989 | Reith | 156/306.6 |
| 4,875,954 | 10/1989 | Griffiths | 156/64 |
| 4,956,033 | 9/1990 | Martin et al. | 156/94 |
| 5,061,735 | 10/1991 | Zielinski | 521/46.5 |
| 5,076,870 | 12/1991 | Sanborn | 156/73.1 |
| 5,080,291 | 1/1992 | Bloom | 241/19 |
| 5,145,617 | 9/1992 | Hermanson et al. | 264/37 |
| 5,169,870 | 12/1992 | Corbin et al. | 521/49.8 |
| 5,169,876 | 12/1992 | Heitmann et al. | 521/155 |
| 5,194,109 | 3/1993 | Yamada | 156/94 |
| 5,221,395 | 6/1993 | Luetkens, Jr. et al. | 156/244.11 |
| 5,230,473 | 7/1993 | Hagguist et al. | 241/3 |
| 5,233,021 | 8/1993 | Sikorski | 528/491 |
| 5,240,530 | 8/1993 | Fink | 156/94 |
| 5,244,971 | 9/1993 | Dekoninck | 525/64 |
| 5,244,973 | 9/1993 | Sakazume et al. | 525/66 |
| 5,294,384 | 3/1994 | David et al. | 264/37 |
| 5,375,778 | 12/1994 | Lundquist | 241/24 |
| 5,518,188 | 5/1996 | Sharer | 241/14 |
| 5,535,945 | 7/1996 | Sferrazza et al. | 241/24.12 |
| 5,719,198 | * 2/1998 | Young et al. | 521/40.5 |
| 5,852,115 | 12/1998 | Young et al. | 525/64 |
| 5,859,071 | 1/1999 | Young et al. | 521/40.5 |

FOREIGN PATENT DOCUMENTS

| | | |
|---|---|---|
| 24 25 751 | 12/1975 | (DE). |
| 38 16 894 | 11/1989 | (DE). |
| 971958 | 10/1964 | (GB). |
| 54-117579 | 9/1979 | (JP). |
| 58-119821 | 7/1983 | (JP). |
| 60-185823 | 9/1985 | (JP). |
| 60-206868 | 10/1985 | (JP). |
| 60-219016 | 11/1985 | (JP). |
| 63-057355 | 3/1988 | (JP). |

OTHER PUBLICATIONS

Soviet Technology Alert, Carpets From Plastic Waste, Elsevier Advanced Technology Publications, vol. 1, No. 3, Mar. 1988.

United Recycling, Inc., Carpet Recycling Is Here!, Midwest Retailer, vol. 21, No. 7, p. 1, Jul. 1992.

Wagner, R.H., A New Technology for Recycling Carpet Waste, Translated from Chemiefasern/Textilindustrie, vol. 28/80, pp. 644–648, Jul., 1978.

Watzl, A., *Recycling of Textile Waste into Nonwovens Products*, Translation of Melliand Textilberichte, 73, p. 397, May, 1992.

Malloy, R., et al., *Reclamation of Automotive Carpet Scrap*, AIChE Spring National Meeting, Mar. 29, 1992.

Ryburn Foam, Ltd.,*Method of Reclamation of Carpet, Slipper and Other Mixed Textile Waste*, RD 19524, Jul. 10. 1980.

Sadrmohaghegh, C., et al., *Recycling of Mixed Plastics*, Polym. Plast. Technol. Eng., 24(2&3), pp. 149–185, 1985. (No Month).

* cited by examiner

Primary Examiner—Ana Woodward
(74) Attorney, Agent, or Firm—Wood, Herron & Evans, L.L.P.

(57) ABSTRACT

Carpet scrap containing mixtures of polyesters and/or polyamides and polyolefins are compatiblized with ultralow density polyethylene (ULDPE) to make homogeneous thermoplastic blends having useful properties.

8 Claims, No Drawings

RECYCLING OF CARPET SCRAP AND COMPOSITIONS EMPLOYING ULTRALOW DENSITY POLYETHYLENE (ULDPE)

TECHNICAL FIELD OF THE INVENTION

This invention relates to a recycling method for preparing a polymeric blend formed from carpet scrap through the use of ultralow density polyethylene and useful products produced therefrom. More particularly, the invention relates to a method of forming a useful product having desired properties from polymeric carpet scrap which contains a polyamide and/or a polyester and a polyolefin which are normally incompatible in molten or solid states, through the use of ultralow density polyethylene (ULDPE).

BACKGROUND OF THE INVENTION

Plastics are now used in every segment of American business and are found in all aspects of daily life. Carpets are now substantially made of plastics. One problem relating to carpets is what to do with them after their service life is exhausted. Furthermore, since a considerable amount of waste is involved in the process of making carpets, the problem also exists of what to do with it once it is generated. For instance, automobile carpet in most instances has a face of fiber forming polymer such as polyamide and/or a polyester and a backing polymer such as a polyolefin or copolymer thereof. Automotive carpet scrap is generated during the cars' fitting process and as post-consumer waste. During the fitting process, a quantity of carpet remnant is generated as the carpet is formed and cut into various irregular shapes. As a result, millions of pounds of carpet waste are generated every year as part of the automobile manufacturing process. It has been difficult to reuse this carpet scrap in the primary manufacturing process, due to problems with separation, and the like. Furthermore, when an automobile is disposed of after its years of useful life, the carpet installed ends up in the waste stream as post-consumer waste.

Besides the carpet waste generated by automobile manufacturing, carpet waste is also generated during residential and non-residential building construction as well as during renovation. The volume of this carpet scrap generated each year is also expected to continue to increase worldwide. Considerable effort has been devoted to recycling carpet waste. Furthermore, the interest in secondary recycling of carpet or other commingled waste continues to increase due to increasing costs of storage and/or land fill space, more stringent regulations for disposal, and incineration, among other things.

A number of methods have been developed for the recycling of carpet scrap. For example, U.S. Pat. No. 5,852,115 discloses the addition of compatibilizing agents to mixtures of carpet scrap. In particular, carpet scrap mixtures of nylon, polyester, polypropylene, polyethylene, ethylenevinyl acetate (EVA), and filler, were compatibilized with a compatibilizing agent selected from the group of a polypropylene having acrylic acid grafted thereon, a maleic anhydride modified polypropylene, a maleic anhydride modified poly(ethylene-co-vinyl acetate), and a poly(ethylene-co-vinylacetate). Substantially homogeneous thermoplastic blends of the carpet scrap and these compatibilizing agents have produced products possessing very useful properties, for instance, tensile strengths, elongations at break, and hardness. Further improvements have been sought in the field of recycling carpet scrap.

SUMMARY OF THE INVENTION

This invention is directed to a method of recycling carpet scrap and to substantially homogeneous thermoplastic blends resulting therefrom. In particular, the method of this invention involves granulating carpet scrap to obtain an incompatible mixture of polyamides and/or polyesters in combination with polyolefins or copolymers thereof. Ultralow density polyethylene (ULDPE) is added as a compatibilizing agent to the heterogeneous mixture for compatibilization of the polymers. Upon heating the granulated scrap in admixture with the compatibilizing agent, substantially homogeneous thermoplastic blends are produced.

It has been found that the addition of ULDPE to carpet scraps having a mixture of polyamide and/or polyester in combination with polyolefins produces very desirable properties. In particular, for example, when 50% by weight mixtures of ULDPE and 50% carpet scrap are blended, elongations at break for the resulting blend are comparable to elongations of the ULDPE alone. The ability to recycle such carpet waste and obtain desirable properties is advantageous. These advantageous results are also considered unexpected since high-density polyethylene (HDPE), linear low density polyethylene (LLDPE) and low density polyethylene (LDPE) when added to the carpet scrap in the same or similar amounts did not produce a blend having advantageous properties such as elongation at break. Accordingly, this invention is predicated in part upon the use of ULDPE as a compatibilizing agent in carpet scrap to produce homogeneous thermoplastic blends that are useful products. Moreover, this invention is also predicated in part upon the unexpected results achieved with ULDPE in contrast to apparently similar polyolefins such as HDPE, LLDPE, and LDPE.

Homogeneous thermoplastic blends of the compositions of this invention may be injection molded or extruded. Injection molding of the compositions produce shaped articles with desirable properties. For example mats and sheets made using the compositions produced properties in the range of general-purpose commodity thermoplastics. The thermoplastic blends were easily processed both for extrusion and injection molding.

In another aspect of this invention, when extruding blends of carpet scrap and ULDPE, a plateout or precipitate on the extrusion die lips may occur. Over time, this build up may break off and mar the surface of the sheets or article being extruded. It has been found by replacing an amount of the ULDPE with an anhydride modified polyolefin or an acrylic acid modified polyolefin that the plateout problem is eliminated with minimal change in physical properties. In particular, minor amounts of about 1% to about 10% of the anhydride modified or acrylic acid modified polyolefin eliminated the plateout problem with minimal change in physical properties.

In a preferred form of the invention, the ULDPE is contained in an amount of about 40% to about 50% by weight of the carpet scrap. When the anhydride modified or acrylic acid modified polyolefin is used to eliminate or reduce the plate out problem, amounts on the order of about 1% up to about 10% by weight of the carpet scrap are employed.

The advantages and the objectives of this invention will be further understood with reference to the following detailed description and operating examples.

DETAILED DESCRIPTION

An automotive carpet scrap used in the following examples has the following general component ranges:

| Scrap Carpet Component | Ranges (% by weight) |
| --- | --- |
| Polyamide (nylon) | about 10-35 |
| Polyester (polyethylene terephthalate) | about 1-6 |
| Polyolefins (polyethylene and polypropylene) | about 8-18 |
| Ethylene vinyl acetate (EVA) | about 15-36 |
| Filler | about 35-60 |

In general, the automotive carpet scrap compositions comprise various amounts of nylon 6, or nylon 6.6, polypropylene, polyethylene, polyester (such as polyethylene terephthalate), ethylene vinyl acetate (EVA), and filled EVA. The EVA employed contains between about 9% and 36% vinyl acetate. The carpet face fibers may comprise polyamides and/or polyesters, typically nylon. A primary backing of polyolefin such as polypropylene, and a mass back of EVA precoated with a filled EVA back coat, is typically provided. More specifically, the back coating contains a filler such as barium sulfate or calcium carbonate with a polymer matrix of EVA containing processing oils. These compositions are well known and comprise a typical North American carpet scrap for automotive purposes. Other typical carpet scrap compositions are disclosed in U.S. Pat. No. 5,852,115 and that disclosure is incorporated herein by reference.

In accordance with the compounding method of the present invention, formulations were usually compounded at temperatures of about 200° C. to about 230° C., and injection molded at about 200° C. to about 205° C. to produce test specimens or finished product for testing, except the molding temperature was higher for those formulations in which polypropylene was used as an additive. Melt compounding of the formulations was done in either a single screw or twin screw extruder. The twin screw extruder is preferred because it offers several advantages over the single screw extruder. The better feeding and more positive conveying characteristics of the twin screw extruder allows the machine to process the carpet scrap. Controllable residence times, a narrow residence distribution (RTD) spectrum, as well as better mixing are other advantages of the twin screw extruder.

Analyses of various samples of carpet scrap were conducted to determine the constituents of the product blends of the present invention. Table 1 shows a typical detailed formulation of one carpet sample used in this study.

TABLE 1

Typical Taurus Scrap Carpet Composition (Taurus)

| Component (% by weight) | Purpose |
| --- | --- |
| 22.2% Nylon 6 or 6.6 | Carpet Face |
| 6.4% Polyethylene terephthalate | Primary Backing |
| 15.9% LDPE | Pre-coat |
| 55.5% CaCO$_3$ Filled EVA | Backcoat |

More specifically, the backcoat set forth above contains 13.3% EVA and 42.2% CaCO$_3$.

Samples from the carpet scrap melt were compounded and pelletized, at temperatures of about 200° C. and 230° C., using a twin screw extruder. Pellets were injection molded at about 200° C. to about 205° C. or, in the case of polypropylene containing samples, at 230° C., into standard ASTM test specimens. Tensile and impact properties were determined as well as Shore hardness and deflection temperature under load. ASTM protocols were followed for all tests as set forth in the Examples which follow. The degradation characteristics of the compounded formulation were determined using Thermogravimetric Analysis (TGA) techniques.

In general, the material processed at the low temperature (180° C.) exhibited higher values of modulus, tensile strength, hardness, and deflection temperature under load than their high temperature (230° C.) counterparts. However, ultimate elongation values for the low temperature processed material were lower. These lower ultimate elongation values are possibly explained by the presence of intact fibers which had not disappeared through melting, thus inhibiting more elastomeric behavior.

The onset of degradation was found to occur in the 180° C. to 200° C. range coinciding with the deacetylation temperature of EVA. Nevertheless, the degree of degradation at 230° C. did not appear to be significant, perhaps due to relatively low residence time during the compounding operation.

It is preferable to dry the blends at temperatures substantially in excess of 90° C., since polyester and nylon are hygroscopic materials. However, the EVA softens and becomes tacky at temperatures in excess of 90° C. Nylons and polyesters tend to degrade during processing if water is present. However, it is expected that most of the water would be removed at this temperature, limiting the amount of degradation.

After drying, the carpet scrap EVA and compatibilizing additives were weighed and premixed in a closed container for five minutes to ensure a better mixing and distribution of additives. This blend was then melt blended inside the intermeshing, co-rotating, twin screw extruder. The extruder was operated at 120 rpm and equipped with a medium shear screw profile and a rod die for pelletization. The extrudates were then cooled in a water bath and pelletized. The operation temperature was set at 230° C. The actual melt temperature was about 237° C. The head pressure for all formulations was in the range of 350 to 470 psi.

The mixed blends of automotive carpet exhibited poor adhesion at the polymer—polymer interface and, thus, poor properties in general. The ULDPE compatibilized different polymers contained in the carpet as set forth in the following Examples.

Ultralow Density Polyethylene

As is understood in the art, ultralow density polyethylene (ULDPE) has a density of about 0.890–0.912. Increasing the density to 0.916–0.935 produces low density polyethylene. Linear low density polyethylene has a density of about 0.918–0.941. In a preferred form, the ULDPE is added to the carpet scrap in an amount of about 40% to about 50% by weight of the carpet scrap. Greater amounts may be employed; however, as a matter of economics, advantageous properties such as elongation at break may be achieved when ULDPE is added within the range of about 40% to about 50% by weight. At these levels, elongations at break greater than 500% are achieved.

For the extrusion of homogeneous thermoplastic compositions containing the ULDPE compatibilizing agent without plateout, a number of anhydride modified polyolefins or acrylic acid modified polyolefins have been found acceptable as listed in the following Table 2.

TABLE 2

| Tradename | Generic Material |
| --- | --- |
| DEFA-1373 NT | Anhydride modified ultralow density polyethylene (ULDPE) |
| Bynel 302 | Anhydride modified polypropylene (PP) |
| Bynel 361 | Anhydride modified ethylene vinyl acetate (EVA) |
| MB226D | Anhydride modified linear low density polyethylene (LLDPE) |
| Polybond 1001 | Acrylic acid modified polypropylene (PP) |
| Polybond 1009 | Acrylic acid modified high density polyethylene (HDPE) |

EXAMPLE 1

This series of experimental studies was conducted in order to evaluate the effectiveness of ULDPE as a compatibilizing agent. The carpet scrap employed is detailed in Table 1. A 50% by weight mixture of the carpet scrap and 50% by weight of ULDPE having a density of 0.885 was processed by the twin screw extruder at temperatures of about 210° C.–230° C., as described above, to produce blends having properties shown in Table 3. By comparison with 100% carpet scrap, the ULDPE produced unexpected properties in the blends including elongation at break of greater than 500% as shown in the following Table 3.

TABLE 3

| Properties | 100% Carpet Scrap | 50% Carpet Scrap 50% ULDPE (Flexomer 1085) |
| --- | --- | --- |
| Tensile Strength (P.S.I.) | 1,009 | 900 |
| Elongation (%) | 7.1 | >500 |
| Notched Izod (Foot - Lb./in.) | 0.85 | No break |
| Melt Index (230° C./2.16 kg) | 10 | 2.1 |
| Flexural Modulus (P.S.I.) | 64,000 | 15,500 |

EXAMPLE 2

Upon extruding a sheet of 50/50 blend of carpet scrap and ULDPE of Example 1, a plateout or precipitate was found to build up on the extrusion lips. The extrusion was conducted under a method of either a single screw or twin screw extruder as mentioned above. Over time, the build up would break off and mar the surface of the sheet. It was found by replacing 10% of the ULDPE with 10% of an anhydride modified EVA (Bynel 361), the problem was eliminated. Replacement of the ULDPE with Bynel 361 at other levels of 5% and 1% respectively, resulted in a total elimination of plateout with minimal change in physical properties, as shown by the following table.

TABLE 4

| | UNITS | 50/40/10 | 50/45/5 | 50/49/1 |
| --- | --- | --- | --- | --- |
| Tensile | (Mpa) | 120 | 105 | 75 |
| Elongation | % | 493 | 591 | 429 |
| Tear | (Mpa) | 73 | 64 | 50 |
| Cold Flex | (−20° C.) | No crack | No crack | No crack |

EXAMPLE 3

The following series of experiments were conducted to reproduce the effectiveness of other anhydride or acrylic acid modified polyolefins. In this series, the anhydride modified EVA was replaced by other anhydride or acrylic acid modified polyolefins, as shown in Table 2, above. All of the above anhydride modified and acrylic modified polyolefins processed plateout free sheet.

EXAMPLE 4

In order to demonstrate the unexpected and advantageous results of ULDPE in comparison to HDPE, LLDPE, and LDPE, a series of experiments were conducted. The properties of the original polyolefins are shown in the following table. Different grades of ULDPE under the tradename Flexomer were used.

TABLE 5

| | M.I. (g/10 min) | Elongation (%) |
| --- | --- | --- |
| ULDPE | | |
| 9042 | 9.0 | 1300 |
| 1137 | 1.6 | 800 |
| 1085 | 1.2 | 985 |
| 1088 | 0.8 | 512 |
| HDPE | | |
| 6200 | 0.5 | 790 |
| LLDPE | | |
| 7340 | 1.1 | 800 |
| LDPE | | |
| 959S | 55 | 95 |
| 40% Filled PP | 20 | 97 |

When the carpet scarp (C.S.) of Example 1 and ULDPE were blended in 50% by weight blends of each, and evaluated for elongation at break, for comparison with HDPE, LLDPE, and LDPE blends, the following elongation at break values were obtained.

TABLE 6

| | M.I. (g/10 min) | Elongation (%) |
| --- | --- | --- |
| 50/50 Blends | | |
| C.S.19042 | 15.0 | 940 |
| C.S./1137 | 3.7 | 960 |
| C.S./1085 | 3.2 | 1000 |
| C.S./1088 | 1.2 | 775 |
| C.S./6200 | 1.6 | 135 |
| C.S./7340 | 3.1 | 385 |
| C.S./959S | 60 | 35 |
| C.S./40% Filled PP | 12.2 | 6 |

With reference to the above table, 50/50 blends of the carpet scrap and ULDPE far out performed the other apparently similar polyolefins. As demonstrated in the Table 6, values of elongation at break were achieved for the 50/50 blends that were comparable to the virgin ULDPE. In contrast, the values for HDPE, LLDPE and LDPE were diminished. Also, in the case of carpet scrap containing 40% filled polypropylene, the elongation at break value was diminished. This data is offered in further support of the unexpected results achieved in accordance with the principles of this invention.

Other benefits and advantages of this invention will be further apparent to a person of ordinary skill in the art with reference to the above detailed description and experimental results, and such modifications are within the scope of this invention.

What is claimed is:

1. A method of recycling carpet scrap to form a substantially homogeneous thermoplastic blend comprising the steps of granulating carpet scrap to obtain an incompatible mixture of a polyamide and/or a polyester in combination with a polyolefin, adding an ultralow density polyethylene (ULDPE) as a compatibilizing agent to said mixture for compatibilization of said polymers, and heating said granulating scrap in admixture with said compatibilizing agent to form a substantially homogeneous thermoplastic blend.

2. The method of claim 1 wherein said ULDPE is contained in an amount of about 40% to about 50% by weight of the carpet scrap.

3. The method of claim 1 wherein said incompatible mixture comprises the following components in % by weight:

about 10 to about 35 polyamide;

about 1 to about 6 polyester;

about 8 to about 18 polyolefin;

about 15 to about 36 ethylene vinyl acetate copolymer; and about 35 to about 60 filler.

4. The method of claim 3 wherein said polyamide is a nylon, said polyester is a polyethylene terephthalate, and said polyolefin is selected from the group consisting of polyethylene and polypropylene.

5. The method of claim 1 comprising the further addition to said mixture of a modified polyolefin selected from the group consisting of an anhydride modified polyolefin and an acrylic acid modified polyolefin.

6. The method of claim 5 wherein the anhydride modified polyolefin is selected from the group consisting of an anhydride modified ultralow density polyethylene, an anhydride modified polypropylene, an anhydride modified linear low density polyethylene, and an anhydride modified ethylene vinyl acetate.

7. The method of claim 5 wherein said acrylic acid modified polyolefin is selected from the group consisting of acrylic acid modified polypropylene and acrylic acid modified high density polyethylene.

8. The method of claim 5 wherein said modified polyolefin is contained in an amount from about 1% to about 10% by weight of said carpet scrap.

* * * * *